(12) United States Patent
Han et al.

(10) Patent No.: US 10,330,041 B2
(45) Date of Patent: Jun. 25, 2019

(54) METHOD OF RESUMING MULTI-PORT INJECTION USING AN INTAKE STROKE AND A VEHICLE USING SAME

(71) Applicant: HYUNDAI MOTOR COMPANY, Seoul (KR)

(72) Inventors: Min-Kyu Han, Hwaseong-si (KR); Jung-Suk Han, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 183 days.

(21) Appl. No.: 15/373,233

(22) Filed: Dec. 8, 2016

(65) Prior Publication Data

US 2018/0073459 A1 Mar. 15, 2018

(30) Foreign Application Priority Data

Sep. 12, 2016 (KR) .................. 10-2016-0117474

(51) Int. Cl.
*B60W 10/02* (2006.01)
*B60W 10/06* (2006.01)
(Continued)

(52) U.S. Cl.
CPC ......... *F02D 41/3064* (2013.01); *B60W 10/02* (2013.01); *B60W 10/06* (2013.01); *B60W 30/182* (2013.01); *F02D 41/022* (2013.01); *F02D 41/126* (2013.01); *F02D 41/26* (2013.01); *B60W 2710/021* (2013.01); *B60W 2710/0627* (2013.01); *B60Y 2300/432* (2013.01); *B60Y 2300/52* (2013.01)

(58) Field of Classification Search
CPC .... F02D 41/3064; F02D 41/26; F02D 41/022; F02D 41/126; B60W 10/06; B60W 30/182; B60W 10/02; B60W 2710/021; B60W 2710/0627; B60Y 2300/52; B60Y 2300/432
See application file for complete search history.

(56) References Cited

U.S. PATENT DOCUMENTS 6,003,489 A * 12/1999 Kamura .............. F02D 41/0087
123/305
6,173,694 B1 1/2001 Kamura et al.
(Continued)

FOREIGN PATENT DOCUMENTS

JP 07006437 A 10/1995
JP H10299540 11/1998
(Continued)

*Primary Examiner* — Jacob M Amick
*Assistant Examiner* — Charles Brauch
(74) *Attorney, Agent, or Firm* — Lempia Summerfield Katz LLC (57) ABSTRACT

A method of resuming multi-port injection using an intake stroke of an engine includes performing a first refueling with immediate start of ignition injection at the time when an injection abortion angle does not pass through an intake stroke, when injection is determined to be resumed after coasting by a controller. The method can minimize an engine RPM drop caused by the early generation of torque. The method improves fuel efficiency while being advantageous to calibration of the engine by setting the engine RPM to be low at the time of fuel cut-in.

7 Claims, 6 Drawing Sheets

(51) Int. Cl.
*F02D 41/02* (2006.01)
*F02D 41/12* (2006.01)
*F02D 41/26* (2006.01)
*F02D 41/30* (2006.01)
*B60W 30/182* (2012.01)

(56) References Cited

U.S. PATENT DOCUMENTS

| | | | |
|---|---|---|---|
| 2007/0208490 A1* | 9/2007 | Baldauf | F02D 41/182 |
| | | | 701/104 |
| 2008/0149073 A1 | 6/2008 | Seto | |
| 2014/0172273 A1* | 6/2014 | Levijoki | F02D 41/04 |
| | | | 701/103 |
| 2015/0088349 A1* | 3/2015 | Akashi | B60W 10/08 |
| | | | 701/22 |

FOREIGN PATENT DOCUMENTS

| | | |
|---|---|---|
| JP | 2002332894 | 11/2002 |
| JP | 2005188339 | 7/2005 |
| KR | 19900011980 | 11/1993 |
| KR | 20080058226 | 6/2008 |
| KR | 20130059749 A | 6/2013 |
| KR | 20150129885 A | 11/2015 |

\* cited by examiner

METHOD OF RESUMING MULTI-PORT INJECTION USING AN INTAKE STROKE AND A VEHICLE USING SAME

CROSS-REFERENCE TO RELATED APPLICATIONS

This application claims priority to Korean Patent Application No. 10-2016-0117474, filed on Sep. 12, 2016, which is incorporated herein by reference in its entirety.

BACKGROUND

Field of the Disclosure

The present disclosure relates to a method of resuming multi-port injection and a vehicle using same.

Description of Related Art

In general, a vehicle multi-port injection (MPI) system is an example of an electronic control injection system, which injects fuel to an injector installed for each cylinder of an engine. The electronic control injection system includes a single-port injection (SPI) system and a port fuel injection (PFI) system.

Specifically, the MPI controlling method of the MPI system is performed by refueling port fuel injection at the time of fuel cut-in, in which fuel injection is resumed, after fuel cut-off, in which fuel injection is blocked, using a fuel cut.

In the MPI controlling method, refueling is performed according to an injection end of ignition (EOI) command angle, based on the fuel injection angle calculated in an exhaust stroke. Therefore, the MPI controlling method is defined as an exhaust injection refueling method.

However, in the method of performing refueling at the injection EOI command angle, since the fuel injection angle is calculated in the exhaust stroke, the refueling at the time of fuel cut-in after fuel cut-off may be performed behind one cylinder or two cylinders on the basis of the ignition top dead center (TDC) of a camshaft after the fuel cut-in is determined to be resumed.

For this reason, an engine revolutions per minute (RPM) drop may occur at the time of fuel cut-in. Accordingly, since the engine RPM must be set to be high at the time of fuel cut-in to resolve the above problem, fuel efficiency may be substantially deteriorated.

The above information disclosed in this Background section is only to enhance understanding of the background of the disclosure. The Background section may therefore contain information that is not prior art to a person of ordinary skill in the art.

SUMMARY

An embodiment of the present disclosure is directed to a method of resuming MPI using an intake stroke of an engine, and to a vehicle that uses the method. The method performs first refueling with immediate start of ignition (SOI) injection in an intake stroke from the earliest cylinder among cylinders through which an abortion angle of a camshaft does not pass when fuel cut-in for injection resumption is determined to be resumed after a coasting condition. The method then performs the refueling according to an EOI command angle, which minimizes an engine RPM drop caused by early generation of torque due to first intake injection. As a result, an engine RPM is set to be low at the time of fuel cut-in so as to be advantageous to calibration, thereby improving fuel efficiency.

Other objects and advantages of the present disclosure can be understood by the following description, and will become apparent with reference to the embodiments of the present disclosure. Also, those having ordinary skill in the art to which the present disclosure pertains will understand that the objects and advantages of the present disclosure can be realized by the written description and claims, and combinations thereof.

In accordance with an embodiment of the present disclosure, a method of resuming MPI using an intake stroke includes: (A) a step of determining whether injection is resumed at the time of a fuel cut-in after a fuel cut-off during coasting by a controller; (B) a step of applying an injection abortion angle to a cylinder at the time when the injection is determined to be resumed, and of setting, as a determined cylinder, a cylinder through which the injection abortion angle does not pass, (C) a step of determining an injection EOI command angle of the determined cylinder, (D) a step of performing a first refueling in the determined cylinder through which the injection EOI command angle passes, and (E) a step of performing the first refueling with EOI command angle injection when the injection EOI command angle does not pass through the determined cylinder.

In the method of resuming MPI, the determined cylinder may be a cylinder having the earliest compression TDC.

In the method, an immediate SOI injection may be changed to EOI command angle injection after the first refueling is performed. In the EOI command angle injection, the refueling may be performed in an exhaust stroke.

In the method, when a clutch pedal is operated to disengage an engine from a manual transmission in an engine idle state during coasting, the performing of refueling may be changed by torque filtering to all cylinders from a partial cylinder.

In accordance with another embodiment of the present disclosure, a vehicle includes an engine having a plurality of cylinders. MPI control is applied to the engine. A controller causes a first refueling to be performed with immediate intake injection in an intake stroke from the earliest cylinder to be injected, through which an injection abortion angle does not pass at a time when a fuel cut-in is determined to be resumed. Subsequent refueling is performed with an exhaust injection.

For the vehicle, the controller may be an engine electronic control unit (ECU) or a hybrid control unit (HCU).

For the vehicle, when the engine is disengaged from a manual transmission by operation of a clutch pedal under a condition in which an RPM of the engine is equal to or lower than a specific RPM in an engine idle state during coasting, the performing of refueling may be changed by torque filtering to all cylinders from a partial cylinder.

DESCRIPTION OF SPECIFIC EMBODIMENTS

Embodiments of the present disclosure are described below in more detail with reference to the accompanying drawings. The present disclosure may, however, be embodied in different forms and should not be construed as limited to the embodiments set forth herein. Rather, these embodiments are provided so that this disclosure will be thorough and complete, and so that the written description will fully convey the scope of the present disclosure to those having ordinary skill in the art. Throughout the written description, like reference numerals refer to like parts throughout the various figures and embodiments of the present disclosure.

Figure 1:
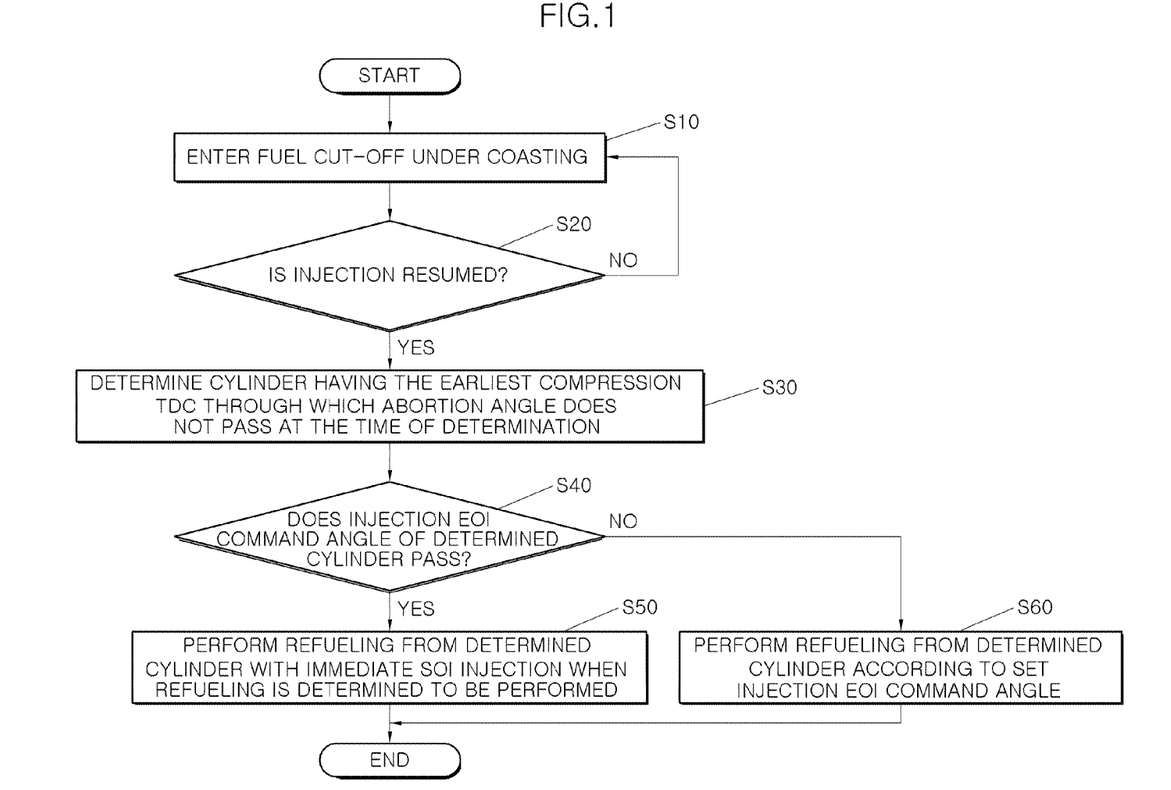
FIG. 1 is a flowchart illustrating a method of resuming MPI using an intake stroke according to an embodiment of the present disclosure.

Referring to FIG. 1, a method of resuming MPI using an intake stroke according to an embodiment of the present disclosure is described. The method is mainly characterized by using the earliest cylinder among cylinders to be injected through which the injection abortion angle of a camshaft does not pass. The earliest cylinder is detected at the time when fuel cut-in for injection resumption is determined to be resumed (S20) after a coasting condition. A first refueling is performed in the earliest cylinder with immediate SOI injection using an intake stroke.

Therefore, the method of resuming MPI determines the earliest cylinder for intake injection among some cylinders rather than among all cylinders. The method reflects the determined cylinder to set a fuel cut pattern for partial resumption of injection. In particular, a vehicle equipped with an engine and a manual transmission may be operating under the condition in which the engine RPM is equal to or lower than a specific RPM in an engine idle state during coasting. Under this operating condition, when the engine is determined to be disengaged from the manual transmission by pressing a clutch pedal, refueling is changed to be performed in all cylinders rather than a partial cylinder even though the refueling is performed in the partial cylinder by torque filtering.

Accordingly, the method of resuming MPI using an intake stroke is characterized by performing refueling from a cylinder having the earliest ignition TDC when fuel cut-in is determined to be resumed after fuel cut-off under a coasting condition.

Figure 2:
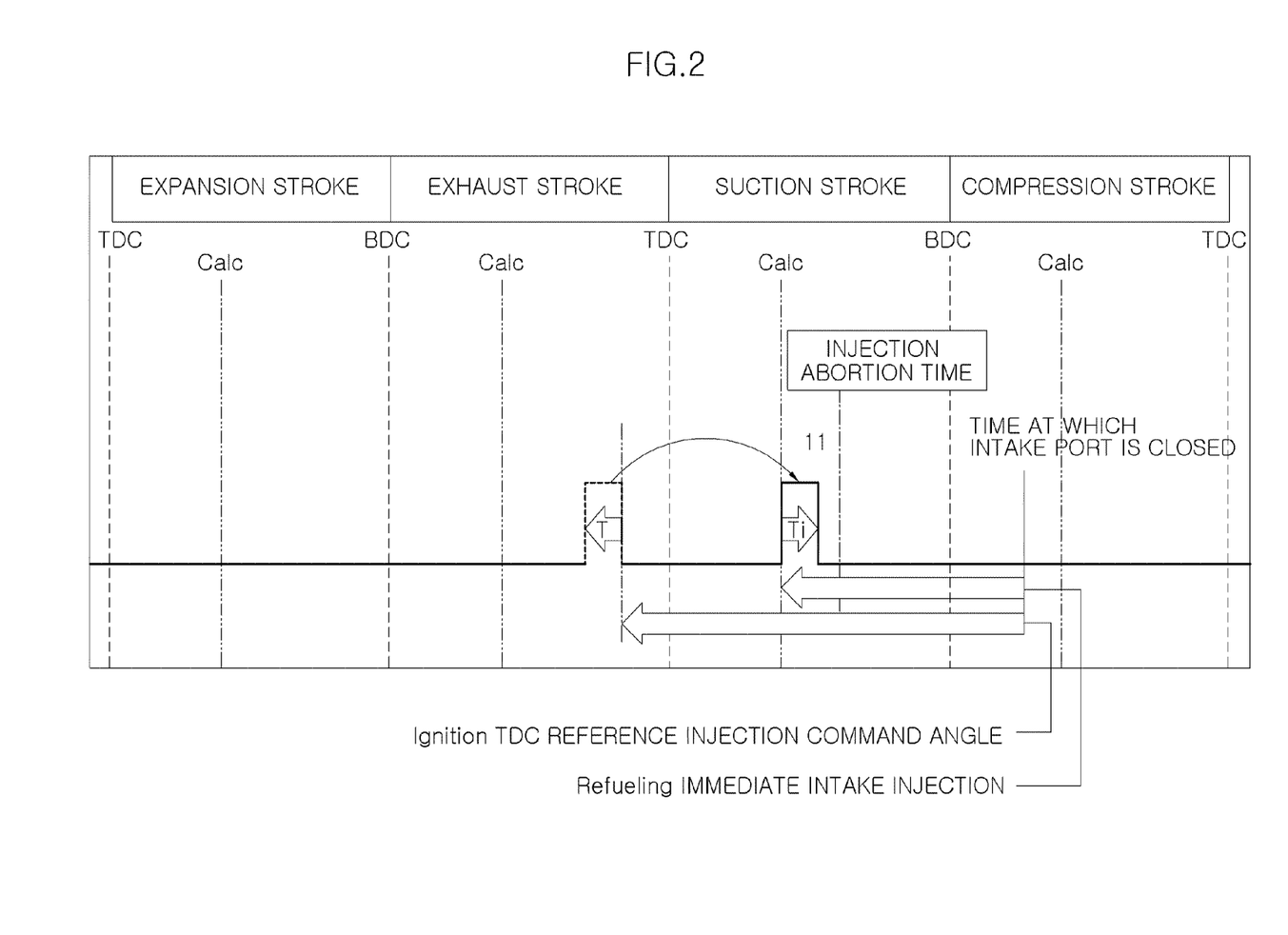
FIG. 2 is an example of a timing chart applied to the method of FIG. 1 of resuming MPI using an intake stroke according to an embodiment of the present disclosure.
Figure 3:
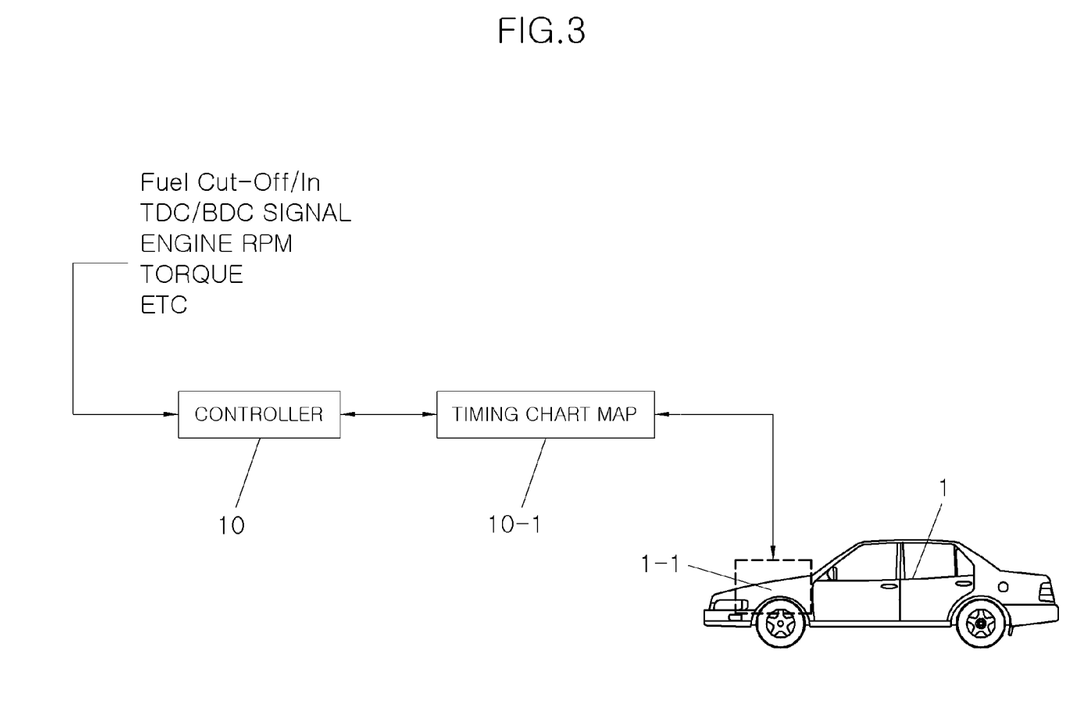
FIG. 3 is an example of a vehicle using the method of FIG. 1 of resuming MPI using an intake stroke according to an embodiment of the present disclosure.

Referring to FIG. 2, the timing chart for controlling the resumption of MPI illustrates that a combustion cycle is classified into a suction stroke (or intake stroke), a compression stroke, an expansion stroke (or explosion stroke), and an exhaust stroke. The abortion angle after a lapse of time, at which fuel injection is calculated (calc) with respect to the ignition TDC cylinder at which refueling determination is calculated in the suction stroke (or intake stroke), is set as an IAA time. As a result, a first refueling is immediately performed through the section indicated by Ti in the suction stroke (or intake stroke) through which the abortion angle does not pass. This enables intake injection (i.e. immediate SOI injection) to be resumed instead of exhaust injection (i.e. EOI command angle injection).

Hereinafter, the method of resuming MPI using an intake stroke will be described in detail with reference to FIGS. 3-6. Here, the control subject is a controller 10 connected to a timing chart map 10-1. The target to be controlled is an MPI system in which an MPI control method is applied to an engine 1-1 of a vehicle 1. In one embodiment, the vehicle 1 may be a hybrid vehicle. Although the engine 1-1 has any number of cylinders, a three-cylinder engine is applied for convenience of description. In addition, the controller 10 may be an engine ECU or an HCU.

S10 is a step of entering fuel cut-off under the coasting condition of the engine 1-1 by the controller 10. Here, coasting means a state in which the engine 1-1 is maintained at a constant speed to reduce fuel in such a manner that a driver does not press an accelerator pedal while the vehicle 1 is driven on a downhill road.

S20 is a step of determining whether injection is resumed at the time of fuel cut-in after fuel cut-off by the controller 10. In this case, the controller 10 applies SOI to the injection resumption determination.

S30 is a step of determining a cylinder having the earliest compression TDC, through which an abortion angle does not pass, at the time when the injection is determined to be resumed by the controller 10. S40 is a step of determining whether an injection EOI command angle of the determined cylinder having the earliest compression TDC passes by the controller 10. In this case, since the abortion angle is a value set based on a fuel injection angle, the case where the abortion angle passes means the passing of the abortion angle, and the abortion angle is applied after the fuel injection angle for each cylinder of the engine. Therefore, the controller 10 performs immediate SOI injection when the injection EOI command angle passes, whereas the controller 10 performs EOI command angle injection when the injection EOI command angle does not pass.

S50 is a step of performing refueling with immediate SOI injection by the controller 10. In this case, the immediate SOI injection is a method of performing refueling based on the fuel injection angle calculated in an intake stroke. Therefore, in the immediate SOI injection, fuel is injected into the cylinder through which the injection EOI command angle passes while having the earliest compression TDC through which the abortion angle does not pass.

On the other hand, S60 is a step of performing refueling with EOI command angle injection by the controller 10. In this case, the EOI command angle injection is a method of typically performing refueling according to the set injection EOI command angle, and is based on the fuel injection angle calculated in an exhaust stroke.

Figure 4:
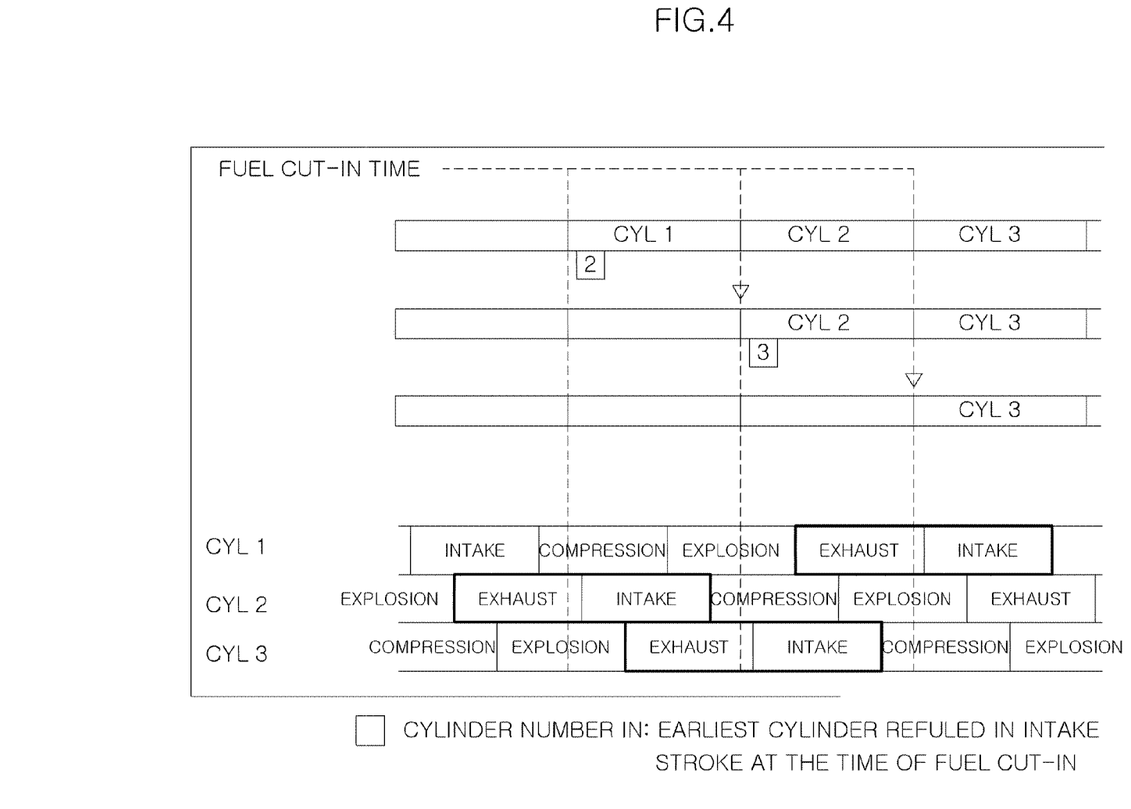
FIG. 4 is a diagram illustrating an intake injection state in which MPI is resumed in the intake stroke of a three-cylinder MPI engine according to an embodiment of the present disclosure.
Figure 5:
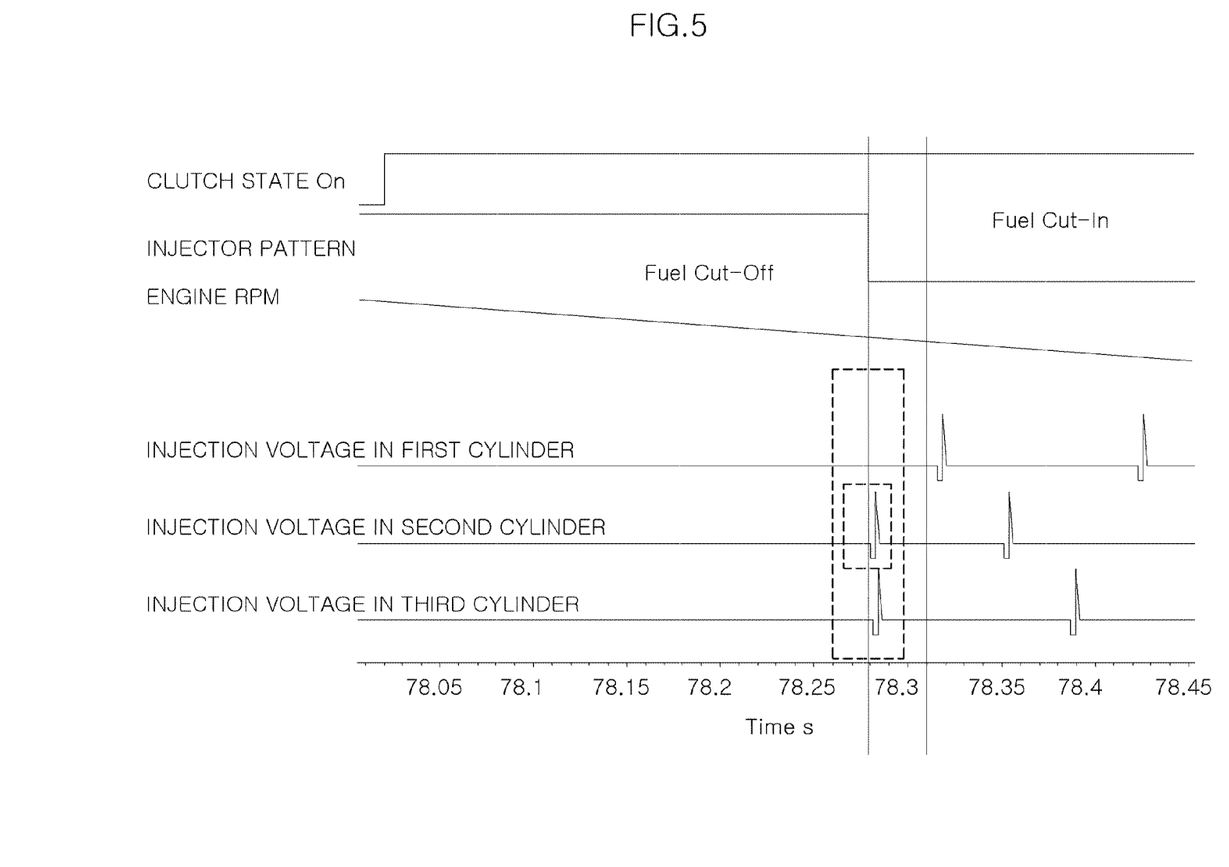
FIG. 5 is a pressure diagram for each cylinder of a three-cylinder MPI engine represented in FIG. 5 in which the intake injection is performed according to an embodiment of the present disclosure.

FIGS. 4 and 5 illustrate an example of immediate SOI injection.

Referring to FIG. 4, a cylinder order can be seen in which refueling is performed through immediate SOI injection in the engine 1-1 having first, second, and third cylinders CYL 1, CYL 2, and CYL 3. By way of example, the cylinders within the range of IAA at the time of fuel cut-in are CYL 1, CYL 2, and CYL 3. Therefore, when the combustion cylinders are CYL 1, CYL 2, and CYL 3, the intake injection is performed in which first refueling is performed in the order of CYL 2→CYL 3→CYL 1. Here, the arrow symbol "→" refers to a progress direction.

Figure 6:
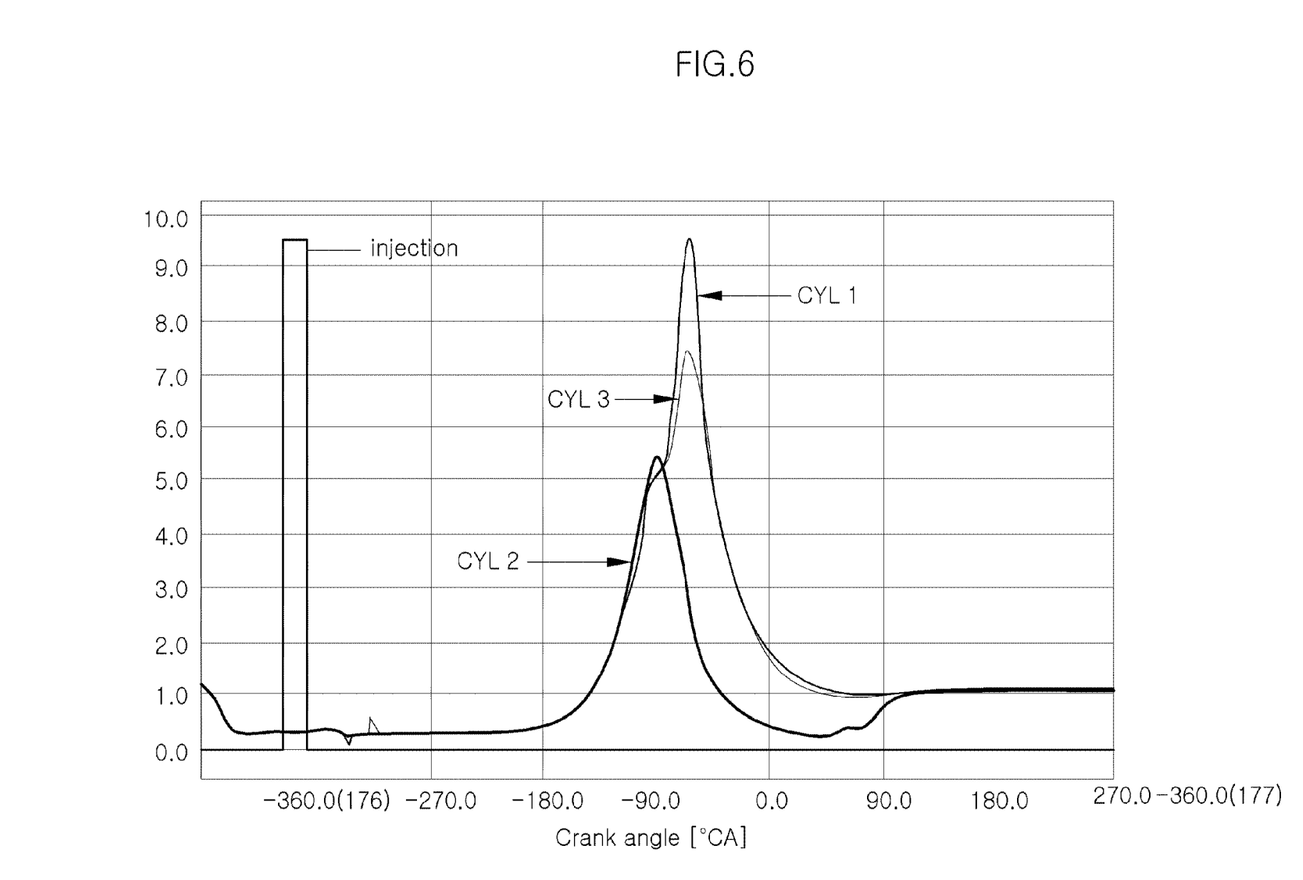
FIG. 6 is a diagram illustrating the operation of a three-cylinder MPI engine represented in FIG. 5 in which the intake injection is performed according to an embodiment of the present disclosure.

Referring to the pressure diagram for each cylinder of the engine 1-1 in FIG. 5 and the operation diagram of the engine 1-1 in FIG. 6, it can be seen that, since the intake injection is performed in the order of CYL 2→CYL 3→CYL 1, an engine torque is early generated and thus an engine RPM drop is minimized.

As such, the immediate SOI injection is performed by detecting the cylinder having the earliest TDC at the time when the injection is determined to be resumed at the time of fuel cut-in after coasting. In this case, when the engine is determined to be disengaged from the manual transmission by pressing the clutch pedal under the condition in which the RPM of the engine is equal to or lower than a specific RPM in the engine idle state while the manual transmission vehicle coasts, the refueling may be performed in all cylinders even though the refueling is performed in a partial cylinder by torque filtering.

Meanwhile, referring to FIG. 2, when MPI control begins by the resumption of fuel cut-in after coasting, the controller 10 performs first refueling through immediate SOI injection in the suction stroke (or intake stroke) through which the abortion angle does not pass, and then performs second refueling and subsequent refueling based on the injection EOI command angle. In this case, the EOI command angle injection shows that refueling is performed in the section indicated by T in the exhaust stroke. Therefore, the above MPI control method may be defined as an intake/exhaust mixing refueling method.

As described above, the method of resuming MPI using an intake stroke according to the embodiment of the present disclosure performs the first refueling through immediate SOI injection at the time when the injection abortion angle does not pass through the intake stroke, when fuel cut-in is determined to be resumed after fuel cut-off under the coasting condition by the controller. Accordingly, it is possible to minimize an engine RPM drop caused by the early generation of torque, and particularly to improve fuel efficiency while being advantageous to calibration by setting the engine RPM to be low at the time of fuel cut-in.

The method of resuming MPI according to the present disclosure has a number of advantages and effects achieved by an intake/exhaust mixing refueling method in which first refueling is performed with immediate SOI injection using an intake stroke and is then performed according to an EOI command angle.

First, a new method of performing refueling at the time of fuel cut-in can be obtained using the abortion angle of a camshaft. Second, since fuel is immediately injected into the earliest cylinder among cylinders to be injected through which the abortion angle of the camshaft does not pass, an engine torque can be early generated by performing the first refueling with the immediate SOI injection. Third, an engine RPM can be set to be low at the time of fuel cut-in so as to be advantageous to calibration by minimizing an engine RPM drop caused by the early occurrence of torque. Fourth, since the fuel cut-in is controlled to be resumed at a lower engine RPM, it is possible to improve fuel efficiency. Fifth, the engine torque can be generated prior to 1-2 segments, compared to an exhaust stroke method, by performing refueling with intake injection when the injection is resumed after a coasting condition, and it is thus possible to minimize the RPM drop in an idle state and reduce the risk of engine stall.

While the present disclosure has been described with respect to the specific embodiments, it will be apparent to those skilled in the art that various changes and modifications may be made without departing from the spirit and scope of the disclosure as defined in the following claims.

What is claimed is:

1. A method of resuming MPI using an intake stroke, the method comprising:
performing a first refueling with immediate SOI injection, when an injection abortion angle does not pass through an intake stroke, when injection is determined to be resumed after coasting by a controller,
wherein the immediate SOI injection includes:
determining whether the injection is resumed at the time of a fuel cut-in after a fuel cut-off during the coasting;
applying the injection abortion angle to a cylinder when the injection is determined to be resumed;
setting a cylinder through which the injection abortion angle does not pass as a determined cylinder;
determining an injection EOI command angle of the determined cylinder, and
performing the first refueling in the determined cylinder through which the injection EOI command angle passes.

2. The method of claim 1, wherein the injection abortion angle is applied after refueling is performed in each cylinder of an engine.

3. The method of claim 1, wherein the determined cylinder is a cylinder having the earliest compression TDC.

4. The method of claim 1, wherein the immediate SOI injection is changed to the EOI command angle injection after the first refueling is performed.

5. The method of claim 1, wherein, in the immediate SOI injection, the first refueling is performed with the EOI command angle injection when the injection EOI command angle does not pass through the determined cylinder.

6. The method of claim 5, wherein, in the EOI command angle injection, the refueling is performed in an exhaust stroke.

7. The method of claim 1, wherein, when a clutch pedal is operated to disengage an engine from a manual transmission in an engine idle state during the coasting, the performing of the refueling is changed to all cylinders from a partial cylinder by torque filtering.

* * * * *